July 26, 1955    W. S. KAISER    2,714,150
RESISTANCE SPOT WELDER
Filed Feb. 24, 1954    2 Sheets-Sheet 2
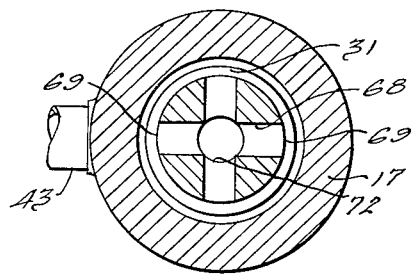
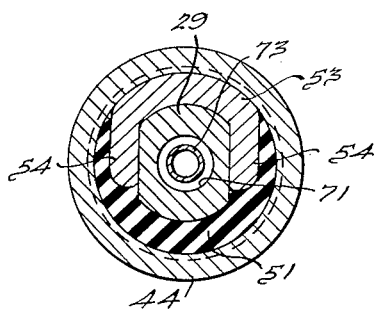
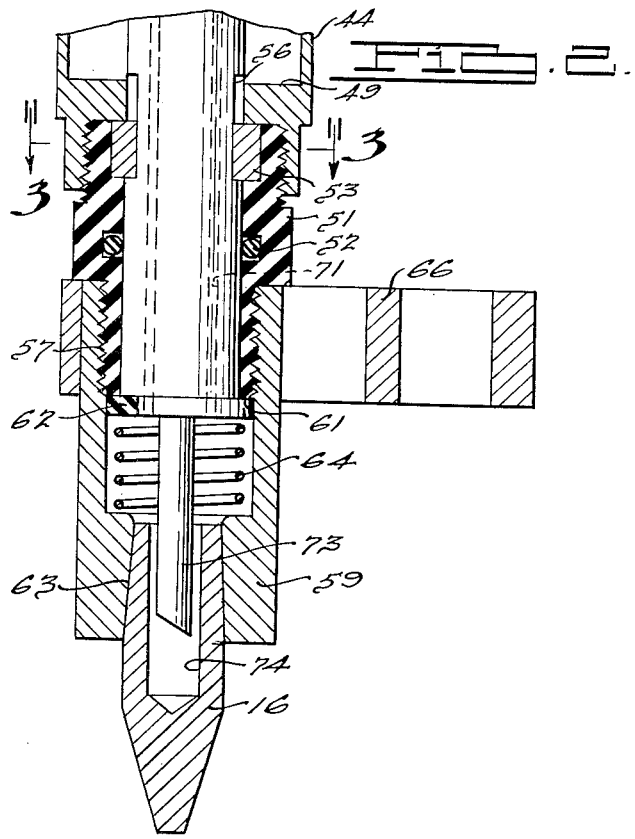
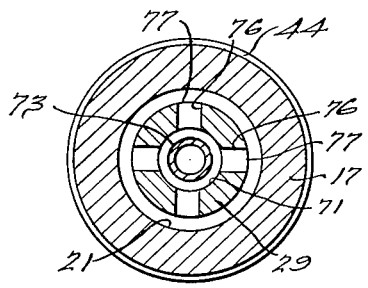
INVENTOR.
Walter S. Kaiser
BY
Harness, Dickey & Pierce
ATTORNEYS.

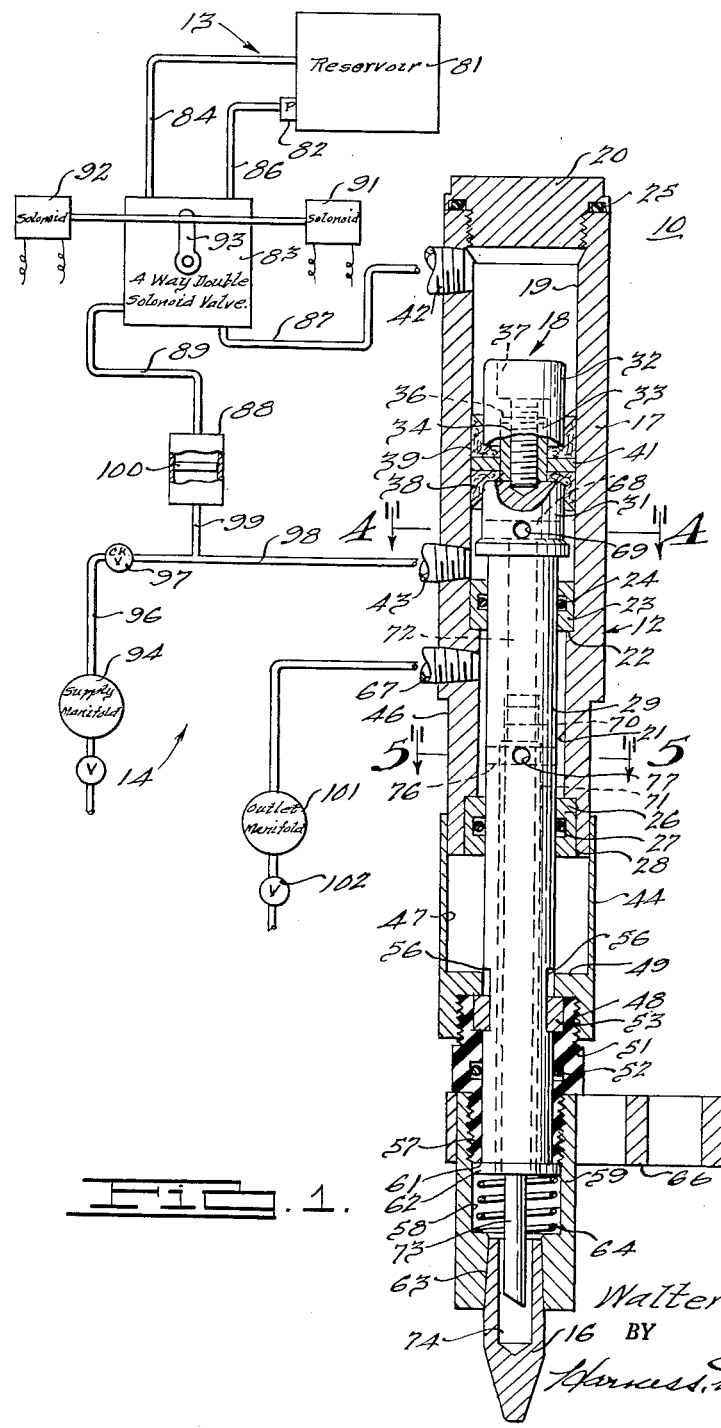

United States Patent Office 2,714,150
Patented July 26, 1955

2,714,150

RESISTANCE SPOT WELDER

Walter S. Kaiser, Highland Park, Mich.

Application February 24, 1954, Serial No. 412,222

13 Claims. (Cl. 219—4)

The present invention relates to resistance welding apparatus and more particularly to new and useful improvements in spot welders of the fluid-operated and cooled type.

In electrical resistance welding apparatus such as is employed in spot welding, it is customary to force a welding electrode against the work to be welded. One method of moving the electrode against the work involves the use of a piston suitably connected to the welding electrode and slidably operated in its power and return stroke by fluid means. In order to attain the power and return stroke of the piston, it has been necessary to provide a fluid coupling connection to the pressure cylinder of the welder, above and below the piston. As a welder of this type is usually placed in continuous operation, it is also customary to cool the welding electrode by passing water through the electrode. This has been generally accomplished by providing an input fluid connection intermediate the welding gun and an output fluid connection adjacent the electrode. As a result, fluid connections have been provided along the entire length of the welding gun. Although the upper connections are situated in a relatively remote position with respect to the work, the lower fluid connection adjacent the electrode tends to interfere with the smooth transfer of work in the unit and further, is subjected to the intense heat generated by the unit and work.

One object of the present invention is to provide an improved resistance welding gun which eliminates the fluid connection adjacent the welding electrode and which employs but a single fluid connection to a driving fluid system.

Another object of the present invention is to provide an improved resistance spot welder utilizing a combined piston return and cooling system.

A further object of the invention is to provide an improved resistance welding gun for producing an automatic follow-up movement of its electrode to provide a forging pressure against work to be welded upon heating the work to a plastic stage.

Still another object of the present invention is the provision of an improved spot welding gun which is simple in construction, efficient and dependable in operation and exceedingly economical to maintain.

These and other objects and advantages of the present invention will become apparent to those skilled in the art as the disclosure is made in the following description of a preferred embodiment of the invention as illustrated in the accompanying sheets of drawings in which:

Figure 1 is a composite view of a resistance spot welder embodying features of the present invention and showing an elevational, sectional view of a resistance welding gun and a diagrammatic view of its fluid driving and cooling system;

Figure 2 is an enlarged fragmentary sectional view of the welding gun showing the detailed construction of the follow-up structure for the welding electrode;

Figure 3 is a cross-sectional view taken on the line A—A of Figure 2 showing the follow-up stop member for the unit;

Figure 4 is a cross-sectional view taken on the line B—B of Figure 1 showing the fluid inlet passages for the cooling fluid; and Figure 5 is a cross-sectional view taken on the line C—C of Figure 1 showing the fluid outlet passages for the cooling fluid.

Referring more particularly to the drawings wherein like reference characters designate like or corresponding parts throughout the several views, there is shown in Figure 1 a resistance spot welder 10 comprising the preferred embodiment of the invention and including a welding gun 12, a fluid pressure system 13 employing hydraulic fluids, air or similar means for providing a pressure fluid, and a cooling system 14 operationally combined with the fluid system 13. As will hereinafter be more fully described, fluid is forced under pressure by fluid system 13 to impel a welding electrode 16 downwardly against work to be welded during a power stroke. Upon engaging the work, an electrical current is passed through electrode 16, the work to be welded, and into a second electrode (not shown) which conducts the current back to its source, whereby a weld is made by generated heat and the applied pressure. During this welding operation, a suitable fluid such as water is forced into electrode 16 by cooling system 14 to cool the electrode. When the operation is completed, fluid from the cooling system, which is operationally combined with fluid system 13, is forced into welding gun 12 to provide a return stroke for the electrode, thereby completing the welding cycle.

As shown in the drawings, the resistance welding gun 12 comprises a hollow welding or pressure cylinder 17 preferably held against movement and adapted to slidably receive a piston 18 therein. For this purpose, cylinder 17 is provided with an upper enlarged bore 19 serving as a cylinder wall for the piston arrangement and a lower reduced bore 21. The upper end of bore 19 is closed by a cap 20 securely threaded thereon and appropriately sealed by an O-ring 25 or the like. Suitably fitted in the lower portion of bore 19 and seated on an abutment 22 is a bushing 23. A fluid seal 24 such as an O-ring or the like is preferably provided on the inner surface of bushing 23, intermediate its ends, for reasons which will hereinafter be set forth. A second bushing 26 having a similar seal 27 is fitted in a counterbore 28 formed on the lower end of bore 21 in cylinder 17. Bushings 23 and 26 serve to slidably mount and position an elongated, cylindrical piston rod 29 within the pressure cylinder.

Piston 18 is secured to the upper end of piston rod 29 within the bore 19 and comprises a pair of enlarged end stops 31 and 32. Preferably, stop 31 is formed integral with rod 29 and is provided on its upper end with a securing boss 33 having an axially threaded bore 34 in its extreme end. Stop 32 is positioned in spaced, aligned relationship with stop 31 by means of a counterbore 36 formed in the lower side of stop 31 which receives boss 33 therein. The two stops are secured together by a bolt 37 threaded through stop 32 and into bore 34 with bolt 37 being recessed in stop 32 such that its upper surface is flush with the top of stop 32. Interposed between stops 31 and 32 and seated on boss 33 are a pair of annular diaphragms 38 and 39 appropriately formed of a resilient material such as leather, felt, rubber or the like. The outer edges of diaphragms 38 and 39 are flexed outwardly in opposed directions and are positioned between their respective end stops 31 and 32 and the wall of bore 19 to provide a substantially fluid-tight but slidable joint therebetween. In order to properly guide the piston in bore 19 and to retain diaphragms 38 and 39 in position, an annular metallic guide separator 41 of slightly smaller diameter than bore 19 is positioned on boss 33 between the diaphragms. The entire piston assembly is securely fastened together by tightening bolt 37 in bore 34.

Located in the wall of pressure cylinder 17, at its upper portion adjacent cap 20 and at its lower portion adjacent bushing 23 are a pair of fluid coupling fittings 42 and 43, respectively. These fittings, which open into bore 19 on opposite sides of piston 18, serve as an access for pressurized fluids selectively fed therethrough for reciprocating the piston in cylinder 17, between cap 20 and bushing 23. The upward travel of piston 18, during a reciprocating movement, is limited by stop 32 engaging cap 20 while the downward travel of piston 18 is limited by stop 31 engaging bushing 23.

The lower end of piston rod 29 carries the head assembly of welding gun 12 including a guided support 44 adapted to co-operate with a reduced outer portion 46 formed on the lower end of cylinder 17. Support 44, for this purpose, is provided with an enlarged bore 47 adapted to slidably fit over reduced portion 46 to guide the head assembly in aligned relation with rod 29 during movement of piston 18 and to shield the piston rod against dust particles or the like which may be present in the area. A second counterbore 48 of slightly smaller diameter than counterbore 47 is formed on the lower end of support 44 and serves with counterbore 47 to define an annular web or abutment 49 therebetween which receives the lower portion of rod 29. Secured to support 44, within counterbore 48, such as by threading or the like is an insulating support bearing 51 formulated from a suitable electrical insulating material such as "polythene."

Bearing 51 is provided on its inner surface, intermediate its ends, with a fluid seal 52 and as best shown in Figures 2 and 3, is recessed on its upper surface for receiving a metallic U-shaped locking stop 53 such that the upper surface portion of stop 53 is flush with top of bearing 51. Preferably, locking stop 53 is formed of high strength material such as steel or the like and is seated in bearing 51 with its extended ends, defining legs 54, encompassing rod 29. The stop 53 is secured in position on bearing 51 by mounting bearing 51 in engaging relation with annular abutment 49 in a manner that the top outer portions of stop 53 abut against annular abutment 49. The legs 54 are formed with the inner edge portions thereof having a slightly smaller spacing therebetween than the diameter of the internal bore of bearing 51 whereby the legs protrude radially inward of bearing 51. Formed on piston rod 29 and adapted to reecive the protruding legs 54 for providing a lost-motion connection between piston rod 29 and the welding head assembly is a pair of transversely disposed grooves 56. Preferably, the grooves are formed on opposite sides of piston rod 29 adjacent abutment 49 and have such a depth that the piston rod defined between the respective grooves 56 engages the inwardly protruding edges of legs 54 with a sliding fit. The vertical width of grooves 56 is made greater than the thickness of stop 53. It will be apparent from this construction that the piston rod is locked to stop 53 but a vertical, relative movement, defining a lost-motion connection, is permitted between these members. In the illustrated embodiment, this relative movement is limited to the difference between the width of grooves 56 and the thickness of stop 53.

The lower end of bearing 51 is provided with a reduced threaded portion 57 which is received in an enlarged counterbore or cavity 58 formed in a welding electrode or point adapter 59. The adapter 59 is removably secured to bearing 51 as by threaded means and is received in cavity 58 such that the extreme lower end of bearing 51 forms an abutment 61 within the cavity. A reduced bore 63 having downwardly and outwardly extended tapered walls is provided in the lower end of adapter 59 and serves to removably receive a welding electrode 16 as by a tight-fit whereby electrode 16 closes the bottom of cavity 58 and is firmly retained in the adapter.

Piston rod 29 terminates in cavity 58 and is provided at its extreme lower end with an electrically insulating annular flange 62 suitably secured thereon and slidably fitting within the cavity. The flange 62 is normally biased upwardly against abutment 61 by a pre-compressed coil spring 64 positioned in cavity 58 and seated upon the lower end of adapter 59 defining the bottom wall of cavity 58. Suitably secured or otherwise formed on the upper outer side of point adapter 59 as by a tight-fit tapered joint is a cable adapter 66 which is adapted to be connected to an electrical jumper (not shown) interposed between the cable adapter 66 and an input electrical power source. As such, the adapter 66 serves to conduct current from the jumper to point adapter 59 and thus, to the welding electrode and work to be welded. The members 66, 59 and 16 are preferably formed from materials having good electrical conducting characteristics and are joined together to provide a minimum resistance path for the current. It will be noted that adapter 59 and welding electrode 16 may vary in size and shape in accordance with the type of work being welded and that the welding electrodes are replaceable in adapter 59 such that the electrodes may be changed for maintenance or to provide a different size or shape electrode to suit the work being welded at the time.

Electrode 16 is cooled and piston 18 impelled upwardly in its return stroke by the medium of a cooling fluid forced into welding gun 12 by cooling system 14. This cooling and piston return arrangement includes fitting 43 which enters pressure cylinder 17 below piston 18 and a cooling outlet fitting 67 positioned on pressure cylinder 17 below bushing 23. The fluid, which is preferably water, enters pressure cylinder 17 through fitting 43 and is conducted to welding electrode 16 by piston rod 29. For this purpose, end stop 31 of piston 18 is provided with transversely disposed inlet passages 68 having a plurality of inlet ports 69 spaced around its periphery and communicating with the passages. It is contemplated that the ports and passages may vary from one to n, the number of inlets being determined by the volume of fluid necessary to cool electrodes 16 and the fluid pressure reducing effect of the passages. Each of these passages is connected with an axial supply passage 72 formed in piston rod 29. Supply passage 72 extends downwardly in rod 29 for a limited distance and preferably extends from inlet passages 68 to a point 70 on rod 29 situated above bushing 23 when piston 18 is in its lowermost position. Connecting with the supply passage 72 and extending from point 70 downwardly to the extreme end of piston rod 29 is an enlarged bore 71.

A tubular supply passage or deflector tube 73 is concentrically mounted in bore 71. The tube 73 is suitably connected to supply passage 72 at point 70 and extends downwardly and beyond the end of rod 29 and into a cavity 74 located in welding tip 16. Formed adjacent the upper end of bore 71 on rod 29 and connecting bore 71 with pressure cylinder 17, intermediate bushings 23 and 26 which define an outlet cavity therebetween, are a plurality of transversely disposed outlet passages 76 having outlet ports 77. These passages 76 serve as an outlet for water flowing from cavity 74 and through bore 71. It will be apparent from the above description that cooling water entering fitting 43 will flow through ports 69, inlet passages 68, supply passage 72, through deflector tube 73, cavity 74, cavity 58, around tube 73 and in bore 71, outlet passages 76, ports 77, outlet cavity of pressure cylinder 17 and through fitting 67. This water which is supplied from cooling system 14 will thus continuously flow in a controlled path past electrode 16 for cooling the electrode.

The pressure fluid and cooling systems for welding gun 12 serve to force fluid into the gun to drive and cool electrode 16. In the preferred embodiment, pressure fluid system 13 is illustrated as comprising a hydraulic system; however, it is contemplated that air or other suitable systems may be employed and are within the scope of the invention. Fluid system 13 includes a reservoir 81 serving as a source of fluid supply and a fluid pump 82 in communication with the fluid supply for forcing fluid from the reservoir to the system under high pressure. The reservoir 81 and pump 82 are connected to a suitable four-way double solenoid valve 83 by a fluid return line 84 and a fluid feed line 86, respectively. The valve 83 which may be of the open-center type is in turn connected to fitting 42 by supply line 87 and to a conventional pressure booster 88 by a booster supply line 89. Under this arrangement, fluid forced from reservoir 81 by pump 82 may be selectively directed to fitting 42 of welding gun 12 or to pressure booster 88 with, in each instance, the fluid being returned to reservoir 81 through line 84. To control the selective flow of fluid, a pair of solenoids 91 and 92 are suitably connected to valve 83 through a control arm 93 provided on valve 83. With this arrangement, operation of solenoid 91 will effect the movement of arm 93 to complete a fluid connection in valve 83 from feed line 86 to supply line 87 and from booster line 89 to return line 84, while actuation of solenoid 92 will operate arm 93 in a manner that the fluid connections of lines 87 and 89 are reversed. Preferably, each of the solenoids is electrically connected to a control mechanism (not shown) which is associated with the welding apparatus and is manually or otherwise controlled by an operator during the welding operation.

The cooling system 14 is operationally combined with the fluid system and includes a supply manifold 94 for supplying water or the like to the system and an outlet manifold 101 which receives and disposes the water flowing directly from fitting 67 of gun 12. Connected to supply manifold 94 by line 96 is a conventional check valve 97 which serves to prevent reverse flow of fluid in line 96. Check valve 97 is connected on its output side to supply fitting 43 on cylinder 17 and to the pressure booster 88 by lines 98 and 99, respectively. As will hereinafter be described in the operation of the unit, pressure booster 88 functions to increase the pressure of the cooling water supply whenever valve 83 is operated in a manner to connect feed line 86 to booster 88. Although any type of booster which performs the desired functions may be employed, booster 88 preferably comprises a free-acting piston 100 slidably mounted in a closed cylinder and adapted to be moved by pressurized fluid entering the closed cylinder from lines 89 or 99 connected on opposite sides of piston 100.

*Operation*

Assuming that a welding operation has just been completed, piston 18 is in its uppermost position with stop 32 engaging cap 20, the supply manifold is open, solenoids 91 and 92 are de-energized, valve 83 is in its neutral position whereby all fluid connections thereto are connected to its center portion such that there is a free flow of fluid from each of these lines to reservoir 81 which permits the water pressure in line 96 to impel piston 100 upwardly, and work to be welded is positioned beneath electrode 16. Actuation of solenoid 91 by an operator turns arm 93 to operate valve 83 such that feed line 86 is connected to supply line 87 and booster line 89 is connected to return line 84. In such a case, fluid is pumped from reservoir 81 by pump 82 and flows from feed line 86 to supply line 87 and from the upper portion of booster 88 to return line 84. The fluid in line 87 enters fitting 42 and acts against piston 18 to impel the piston downwardly. It will be noted that due to cap 20 sealing the top of cylinder bore 19 and the flush-fit of diaphragms 38 and 39 in the bore, the fluid is prevented from escaping from the upper portion of the pressure cylinder. As the piston moves downwardly, the piston rod 29 secured to piston 18 carries the welding head assembly therealong; the assembly being resiliently retained in position on rod 29 by spring 64 which acts to force flange 62 into engagement with abutment 61. During this movement, locking stop 53 engages the lower end of grooves 56 and flange 62 is maintained in engagement with abutment 61. Upon electrode 16 engaging the work to be welded, the force applied to piston 18 continues to move piston 18 downwardly for a limited distance to increase the pressure on the work. This additional movement is taken up by the lost-motion connection including grooves 56 and by spring 64. It will be noted that the lost-motion connection and the spring compression force are arranged such that upon electrode 16 exerting the proper welding force on the work, the locking stop 53 does not engage the upper limit of the lost-motion connection and spring 64 is not fully compressed.

When the proper force is applied to the work, electrical current is passed through adapters 66 and 59, electrode 16, through the work to be welded, a second electrode (not shown) and back to its source. Due to the resistance of the work to electrical current and the quantity of current passed therethrough, the work becomes heated to a plastic stage. As the work enters a plastic stage, a follow-up action is attained in welding gun 12 by the lost-motion connection whereby a forging pressure is applied to the work to induce fusion. Since pressurized fluid is still being applied to piston 18 when the work enters the plastic stage and the structural resistance of the work is slightly lowered in its plastic stage, the electrode 16 tends to advance under the pressure exerted by the piston. Such motion is extremely desirable in order to induce fusion of the plastic work. With the lost-motion connection, the electrode is permitted to advance against the work with full pressure applied thereto inasmuch as piston rod 29 moves relative to stop 53 between the limits of grooves 56. As such, a forging pressure is independently and automatically applied by the unit.

During the welding operation, water under pressure is supplied from manifold 94 through valve 97, line 98, fitting 43 and into pressure cylinder 17 below piston 18. The water which is retained between piston 18 and bushing 23 by diaphragms 38 and 39 and seal 24, respectively, enters ports 69 of passages 68. This water flows downwardly through passage 72, tube 73, and into welding electrode 16 and cavity 58 for cooling purposes. It will be noted that the water is prevented from leaving cavity 58 by fluid seal 52 in bearing 51 but passes around tube 73 into bore 71, upwardly to the outlet passages and ports 76 and 77, and into the outlet cavity of pressure cylinder 17 which is located between bushings 23 and 26. To insure a controlled passage of fluid in the outlet cavity, seals 24 and 27 are provided on bushings 23 and 26. The cooling water then flows out of the cavity, through fitting 67 and into outlet manifold 101. It will be apparent that during this cooling cycle, water continually passes electrode 16 and adapter 59 for cooling purposes. While this water enters pressure cylinder 17 beneath piston 18, some force is exerted against piston 18 in an upward direction; however, the water pressure is such that it is considerably lower than the fluid pressure from system 13 and does not appreciably effect the operation of the piston.

After the welding operation is completed, the electric current is cut off, solenoid 91 is de-energized and solenoid 92 energized to actuate four-way valve 83. Upon actuation of valve 83, the fluid connections in valve 83 are changed such that fluid is now fed from pump 82 directly to booster 88 and from supply line 87 to return line 84. Since the pressure of water from supply manifold 94 may not be sufficiently great to impel piston 18 upwardly during the return stroke, the cooling fluid pressure is increased by booster 88. Therefore, when feed line 86 from pump 82 is connected to booster 88, the force exerted on piston 100 by the pressurized fluid acts to impel piston 100 downwardly which in turn forces water from the lower end of the booster cylinder at an increased pressure. If desired, a two-way valve 102 may be provided in the output line of fitting 67 and adapted to be closed whenever the piston is to be impelled upwardly during the return stroke. In so doing, the cooling water is prevented from flowing in tube 73 at that time such that the entire pressure exerted by the pressurized fluids in line 98 may be utilized to force the piston upwardly during the return stroke. This water flows through lines 99, 98 fitting 43 and upwardly against piston 18 to impel the piston upwardly for the return stroke. To prevent water from flowing from booster 88 to supply manifold 94 under the increased pressure, check valve 97 is inserted in the lines therebetween. Upon piston 18 reaching its uppermost position, solenoid 92 is de-energized and valve 83 returned to its neutral position to permit piston 100 to be impelled upwardly by the fluid in line 96. The welding cycle is then completed and the apparatus is ready for another cycle.

While it will be apparent that the preferred embodiment of the invention herein disclosed is well calculated to fulfill the objects above stated, it will be apparent that variations in the design and construction of the various elements and components comprising the resistance welder may be made without departing from the spirit and scope of the appended claims. In particular, it should be observed that while the welding gun is illustrated as comprising a single unit, additional or multiple units may be combined in a single mechanism with a single fluid and cooling system operating to supply fluid to each of the units.

What is claimed is:

1. In a resistance welder adapted to be operated and cooled by fluid means, a welding gun including a pressure cylinder, a piston slidably mounted in said cylinder and having a piston rod extending outwardly of the pressure cylinder, a welding electrode, lost-motion means connecting said electrode to the piston rod, means to impel the piston downwardly during a power stroke including a fluid pressure system connected to said cylinder, means to impel the piston upwardly during a return stroke including a cooling system connected to the cylinder, said fluid pressure system being operatively connected to the cooling system for increasing the fluid pressure of said cooling system during the return stroke, and means for cooling the electrode comprising passage means connecting said cooling system and the welding electrode.

2. In a resistance welder adapted to be operated and cooled by fluid means, a welding gun including a pressure cylinder, a piston slidably mounted in said cylinder and having a piston rod extending outwardly of the piston cylinder, a welding electrode adapted to be connected to a source of electrical current, lost-motion means connecting said electrode to the piston rod, means to impel the piston downwardly during a power stroke for forcing the electrode against work to be welded including a fluid pressure system connected to the cylinder and operative to supply fluid under pressure to said cylinder, means to impel the piston upwardly during a return stroke, said last-named means including a cooling system connected to the cylinder and operative to supply a cooling fluid to the cylinder, said fluid pressure cylinder having a pressure booster connected to the cooling system for increasing the pressure of said cooling system during the return stroke, and means for cooling the welding electrode, said last-named means comprising fluid passage means formed in said gun and connecting said cooling system connection with the welding electrode.

3. In a resistance welder adapted to be operated and cooled by fluid means, a welding gun comprising a pressure cylinder, a piston slidably mounted in said cylinder and having a piston rod extending beyond the piston cylinder, a welding electrode adapted to be connected to a source of electrical current, lost-motion means connecting said electrode to the piston rod, and means for operating said piston and cooling said electrode, said last-named means including a fluid pressure system having a fluid supply, valve means selectively connecting said fluid supply to a pressure booster and to the pressure cylinder above said piston, said fluid pressure system being operative to impel the piston downwardly when the fluid supply is connected to the pressure cylinder, a cooling system having a source of cooling fluid supply connected to the pressure booster and to the cylinder below the piston, said cooling system being operative to impel the piston upwardly when the fluid supply of the fluid pressure system is connected to the booster, passage means in the piston rod between the cooling fluid supply connection and the electrode, and an outlet connection on said cylinder connecting an outlet manifold of the cooling system and said passage means.

4. In an apparatus as defined in claim 3 but further characterized by said passage means comprising a fluid inlet deflector tube concentrically mounted in a bore in said piston rod, said deflector tube providing an inlet for cooling fluid to the electrode and said bore and tube defining an outlet passage for the cooling fluid from said electrode.

5. In a resistance welder having a welding gun comprising a piston and a welding electrode carried thereby, means for driving said piston and for cooling said electrode comprising, a fluid pressure system having a source of fluid supply, pumping means in communication with said fluid supply, a selectively operated valve means operatively connected on one side thereof to said pumping means by a feed line and to said fluid supply by a return line, said valve means being connected to a pressure booster and to the welding gun on the other side thereof such that operation of the valve is effective to control the flow of fluid from the feed line to the pressure booster and welding gun, a cooling system connected to the pressure booster and to the welding gun, said fluid pressure system being operative to impel the piston in a first direction when the feed line is connected to the welding gun, said cooling system being operative to supply cooling fluid to the electrode of the welding gun and to impel the piston in a second direction whenever the feed line is connected to the pressure booster.

6. In a resistance welding gun adapted to be operated and cooled by fluid means, a pressure cylinder, a piston slidably mounted in the cylinder and having a piston rod extending outwardly of the cylinder, spaced means in said cylinder for guiding said rod centrally of the cylinder and for defining a fluid outlet cavity therebetween, a welding electrode adapted to be connected to a source of electrical current, lost-motion means connecting said electrode to said piston rod, a fluid supply port and a cooling fluid inlet port positioned on said cylinder above and below said piston respectively, said cooling fluid inlet port being above a first of said spaced means, a cooling fluid outlet port positioned on said cylinder between said spaced means, an inlet passage means in said piston rod having a first port in open communication with said cooling fluid inlet port and a second port entering the welding electrode, an outlet passage means in said piston rod extending from said electrode to the outlet cavity whereby fluid entering the fluid supply port is operative to impel the piston in a first direction, the fluid entering the inlet port is operative to impel the piston in a second direction and to pass through the piston rod, past the electrode and out the outlet port for cooling the electrode.

7. In a resistance welding gun adapted to be operated and cooled by fluid means, a pressure cylinder having an enlarged upper bore and a reduced lower bore, a piston slidably mounted in said upper bore and having a piston rod extending downwardly through said reduced lower bore and outwardly of the casing, means for closing the upper portion of said upper bore, means including said piston rod and spaced means positioned adjacent the upper and lower portions of said lower bore respectively for effectively closing the lower portion of said upper bore and the end portions of said lower bore, whereby a pair of cavities are provided in said cylinder, a fluid supply port and a fluid inlet port formed in said cylinder above and below said piston respectively and entering a first of said cavities, a fluid outlet port formed in said cylinder intermediate said spaced means and entering a second of said cavities, a welding head assembly including a welding electrode adapter and a welding electrode connected to an outer end of said piston rod by lost-motion means, said piston rod being received in a third cavity formed in said welding electrode adapter, a first fluid passage means formed in said piston and communicating with the fluid inlet port, a second passage means having portions formed in said piston rod and having an upper port entering said first passage means, said second passage means including passage means extending outwardly of the piston rod, through said third cavity and into a fourth cavity formed in said welding electrode, a third passage means formed in said piston rod and extending from the outward end of the piston rod to said second cavity, whereby fluid entering said fluid supply port is operative to impel the piston in a first direction, and fluid entering said fluid inlet port is operative to impel the piston in a second direction and pass through said first and second passage means, the fourth and third cavity, third passage means, second cavity and through said fluid outlet port for cooling the welding electrode.

8. In a resistance welding gun adapted to be operated and cooled by fluid means, a pressure cylinder, a piston slidably mounted within said cylinder and having a piston rod extending through and outwardly of said cylinder, a welding head assembly including a welding electrode adapter and a welding electrode connected to the outer end of said piston rod by a lost-motion means, said lost-motion means including a stop member on one of said members and a groove which receives the stop member formed in the other of said members, means on said head assembly for normally biasing the head assembly outwardly with respect to the piston rod such that the stop member normally engages the outward edge of said groove, said lost-motion means and said biasing means being operative to provide a follow-up action of said electrode during a welding operation, and means to provide fluid access to said piston for impelling the piston during a welding operation.

9. In a resistance welding gun adapted to be operated and cooled by fluid means, a pressure cylinder, a piston slidably mounted within said cylinder and adapted to be driven in a power and return stroke, a piston rod connected to said piston and extending through and outwardly of said cylinder, a welding head assembly including a welding electrode adapter and welding electrode connected to an outer end of the piston rod by a lost-motion means, said lost-motion means including a rigidly positioned stop member mounted on said head assembly and a groove formed in said piston rod which receives the stop member, said groove having a width greater than the depth of said stop member, said welding electrode adapter having an enlarged cavity therein which receives the end portion of said piston rod, and means in said cavity for biasing said head assembly outwardly with respect to the piston rod such that the stop member normally engages the outward edge of the groove, whereby said lost-motion means is operative to provide a follow-up action during a welding operation.

10. In a resistance welding gun adapted to be operated and cooled by fluid means, a pressure cylinder having a piston slidably mounted therein and adapted to be driven in a power and return stroke, a piston rod connected to said piston and extending through and outwardly of said cylinder, a welding head assembly connected to an outer end of the piston rod by a lost-motion connection and carried by said piston rod, said head assembly including a guide member adapted to slidably fit over the outer end portion of said cylinder, said guide member being provided with an annular stop flange which receives said piston rod, an insulated member having a bore therethrough secured to said guide, a stop member, said stop member being mounted on said insulated member with an upper portion thereof abutting said stop flange, a groove formed in the piston rod adjacent said stop flange and adapted to receive an inner edge portion of said stop member for forming the lost-motion connection, an electrode adapter having an enlarged cavity secured to said insulated member such that the member and adapter form an abutment within the cavity, said piston rod extending through said insulating member and terminating in said cavity with its outer end portion being provided with an annular flange adapted to engage the abutment, spring means mounted in said cavity between the annular flange of the piston rod and the adapter for biasing the head assembly outwardly with respect to the piston rod, and a welding electrode mounted on said electrode adapter.

11. An apparatus as defined in claim 10 but further characterized by said pressure cylinder having a fluid inlet port and a fluid outlet port formed therein, said inlet and outlet ports being separated by said piston rod and a bearing means, fluid inlet passage means having a first port in open communication with said fluid inlet port and a second port entering the welding electrode and an outlet passage means in said piston rod extending from said electrode and connecting with said oulet port, whereby fluid entering said inlet port is operative to pass through the inlet passage of said piston rod to the welding electrode and through the outlet passage in said piston rod to the outlet port for cooling the electrode.

12. In a resistance welding gun adapted to be operated and cooled by fluid means, a pressure cylinder having an enlarged upper bore and a reduced lower bore, a piston slidably mounted in said upper bore and having a piston rod extending downwardly through said reduced lower bore and outwardly of the cylinder, means for closing the upper end of said upper bore, means including said piston rod and spaced means positioned adjacent the upper and lower portion of said lower bore, respectively, for effectively closing the lower end of said upper bore and the end portions of said lower bore whereby a pair of cavities are formed in said cylinder, a fluid supply port and a fluid inlet port formed in said cylinder above and below said piston respectively and entering a first of said cavities, a fluid outlet port formed in said cylinder intermediate said spaced means and entering a second of said cavities, a welding head assembly connected to the outer end of the piston rod by a lost-motion connection and adapted to be carried by said piston rod, said head assembly including a guide member adapted to slidably fit over the outer edge portion of said cylinder for maintaining the head assembly in aligned relation with said piston rod, said guide member being provided with an annular stop flange which receives said piston rod, an insulated member having a bore therethrough secured to said guide, a stop member, said stop member being mounted on said insulated member with an upper portion thereof abutting said stop flange, a groove formed in the piston rod adjacent said stop flange and adapted to receive an inner edge portion of said stop member for forming the lost-motion connection, an electrode adapter having a third cavity therein secured to said insulating member such that the insulating member and adapter form an abutment within the third cavity, said piston rod extending through said insulating member and terminating in said cavity, an annular flange formed on the outer end portion of the piston rod and adapted to engage said abutment, spring means mounted in said third cavity between the annular flange of the piston rod and the adapter for biasing the head assembly outwardly with relation to the piston rod, a welding electrode having a fourth cavity therein mounted on said electrode adapter, a first fluid passage means formed in said piston and communicating with said fluid inlet port, a second passage means formed in said piston rod and an upper port entering said first passage means, said second passage means including passage means extending outwardly of the piston rod, through said third cavity and into the fourth cavity formed in said welding electrode, a third passage means formed in said piston rod and extending through the outward end of the piston rod to said second cavity, such that fluid entering into said fluid supply port is operative to impel the piston in a first direction, through said first and said second passage means, said third and fourth cavities and through said fluid outlet port, respectively, for cooling the welding electrode, and whereby fluid entering said fluid supply port is operative to impel the piston in a second direction.

13. In an apparatus as defined in claim 12 but further including a fluid pressure system connected to the fluid supply port of said cylinder for supplying fluid therethrough to impel the piston in said second direction, a booster means selectively connected to said fluid pressure system, and a cooling system connected to said fluid inlet port, said fluid outlet port, and to said booster, said cooling system being operative to supply fluid to said passage means in the piston rod and to impel the piston in said first direction whenever the fluid system is connected to said booster.

References Cited in the file of this patent

FOREIGN PATENTS 412,838   France _____ Feb. 19, 1934